United States Patent [19]

Telchuk, Jr. et al.

[11] 4,328,012
[45] May 4, 1982

[54] AIR WASHER/SCRUBBER

[75] Inventors: Steve E. Telchuk, Jr., Des Plaines; Leslie H. Brown, Carol Stream; Donald F. Gerdes, Park Ridge, all of Ill.

[73] Assignee: Binks Manufacturing Company, Franklin Park, Ill.

[21] Appl. No.: 252,038

[22] Filed: Apr. 8, 1981

[51] Int. Cl.³ .............................................. B01D 47/00
[52] U.S. Cl. .......................................... 55/90; 55/226; 55/240; 55/241; 55/257 NP; 261/118; 261/DIG. 54; 261/112; 98/115 SB
[58] Field of Search ................ 98/115 SB; 55/93, 94, 55/226, 240, 241, 90, 257 NP; 261/108, 110, 109, 118, DIG. 54, 112

[56] References Cited

U.S. PATENT DOCUMENTS

| | | | |
|---|---|---|---|
| 3,347,024 | 10/1967 | Dock et al. | 55/226 |
| 3,516,230 | 6/1970 | Saubesty | 98/115 SB |
| 4,045,524 | 8/1977 | Bornert | 98/115 SB |
| 4,239,512 | 12/1980 | Dobias | 261/DIG. 54 |
| 4,257,784 | 3/1981 | Gebhard et al. | 261/DIG. 54 |

Primary Examiner—Bernard Nozick
Attorney, Agent, or Firm—Gary, Juettner & Pyle

[57] ABSTRACT

An air washer or scrubber, particularly for paint spray booths and especially adapted for removing paint particles from air passing downwardly through the grille floor of a paint spray booth and against a water-washed subfloor, comprises an elongated V-shaped slot in the subfloor extending along the longitudinal centerline of the booth. The inner edges of the walls forming the V-shaped slot are upturned to form ledges so that water flowed over the subfloor and the walls of the slot impinges against the ledges and is thrown upwardly and inwardly to form a curtain of water completely covering the slot. Exhaust means pulls paint-laden air from the spray chamber through the water curtain and the slot and into an expansion chamber, the bottom walls of which form a second V-shaped slot contiguous with the first mentioned slot. The water, in which virtually all of the paint particles are entrained, and the air are discharged from the second slot and impinged against a baffle sheet angling downwardly away from the expansion chamber. The end of the sheet is upturned at a small angle to deflect the water and form an umbrella of water through which the air must pass for a final cleaning action. An optional curved deflector plate positioned beneath the umbrella of water aids in separating the water and air so that only clean, dry air is exhausted to atmosphere.

15 Claims, 3 Drawing Figures

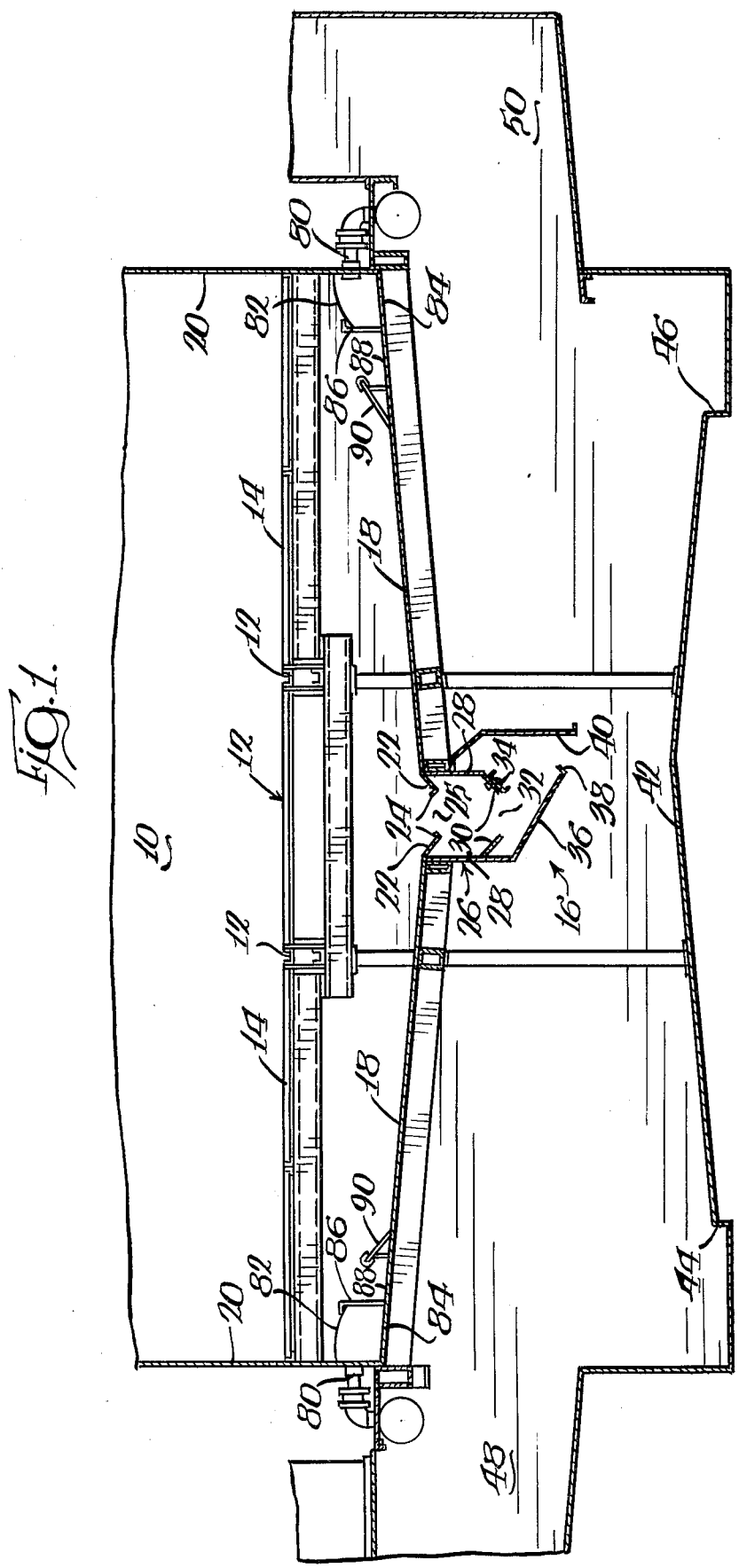

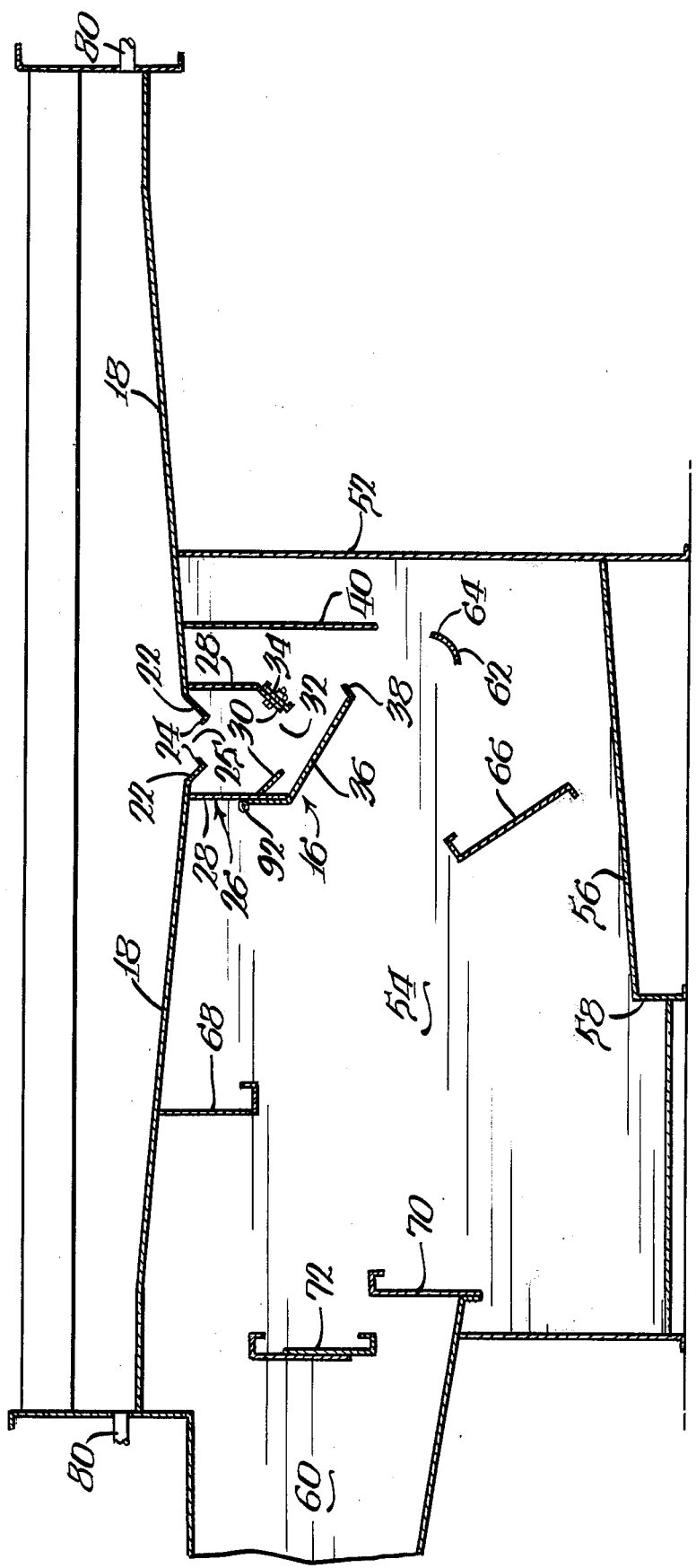

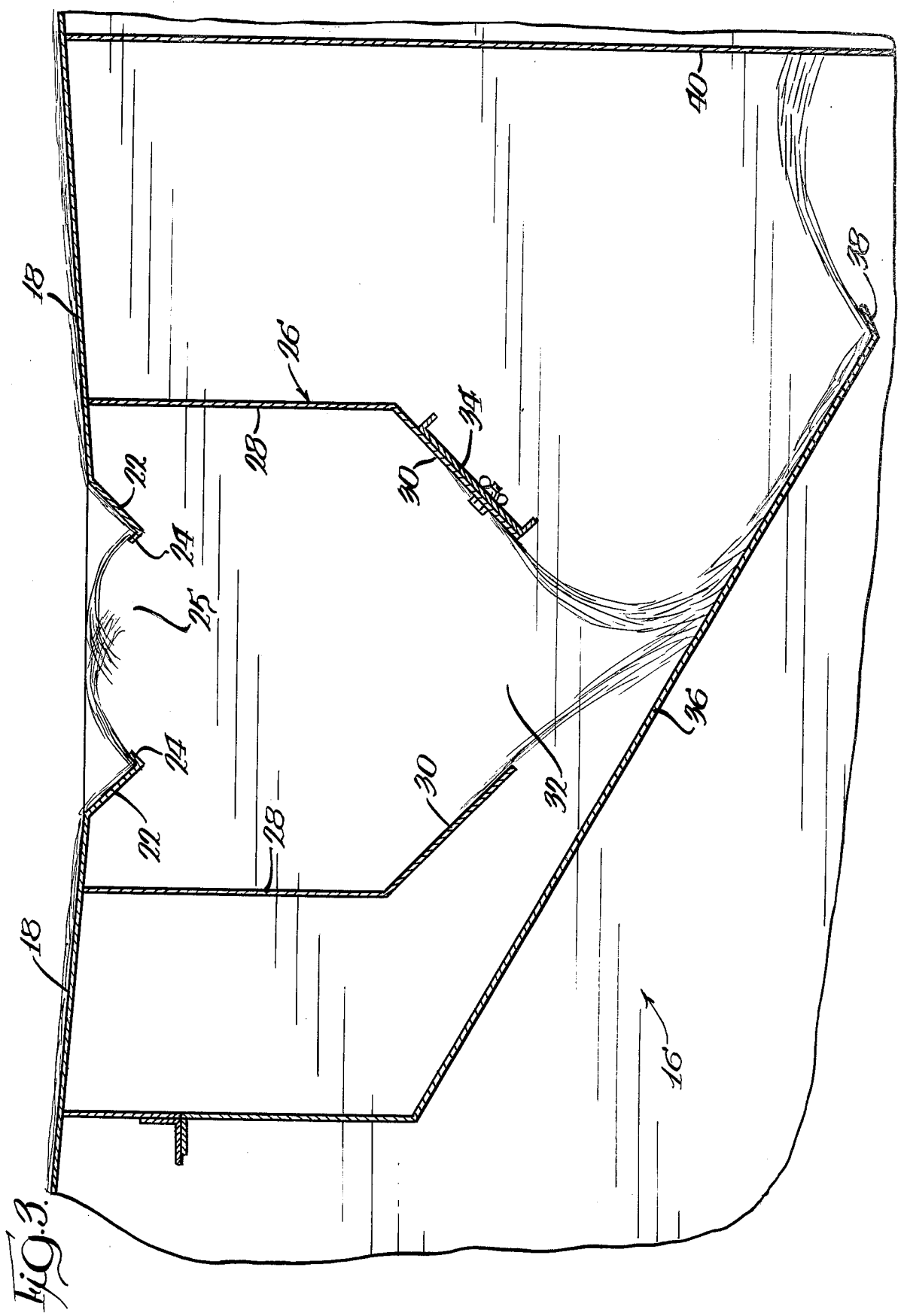

AIR WASHER/SCRUBBER

BACKGROUND OF THE INVENTION

This invention relates to apparatus and method for removing contaminants from gas and, particularly, for removing paint overspray from the ventilating air moved through a paint spray booth.

While many air washing or scrubbing systems have been devised, only a small number of them have proven to be satisfactory to meet the demands of the automotive industry and environmental protection agencies. While some prior art washers are very efficient for certain types of paint, they have failed in meeting the necessary standards with the newly developed paints having extremely small particle sizes.

Air washers and scrubbers customarily embody one or more and frequently several washing actions, which actions may be categorized as follows and examples of which are shown in the patents listed under each category. As will be noted, several of the patented washers or scrubbers embody several of the listed actions, some as many as five.

1. Spray or Cross Spray In A Tube

| Name | Number | Year |
|---|---|---|
| Dye | 420,378 | 1890 |
| Richards | 888,119 | 1908 |
| Thomas | 1,246,355 | 1917 |
| Frey | 1,999,589 | 1935 |
| Saunders | 2,086,514 | 1937 |
| Brandes | 2,090,994 | 1937 |
| Fisher | 2,337,983 | 1943 |
| Doyle | 2,621,754 | 1952 |
| Tailor | 3,050,919 | 1962 |
| Gallagher | 3,119,675 | 1964 |
| Panzica | 3,328,009 | 1967 |
| Gallagher | 3,782,080 | 1974 |
| Dobias | 4,239,512 | 1980 |
| France | 1,192,088 | 1959 |
| Germany | 1,157,977 | 1963 |
| Canada | 687,417 | 1964 |

2. Liquid Curtain, Spray or Jets

| Name | Number | Year |
|---|---|---|
| Carrier | 1,138,081 | 1915 |
| Bingman | 1,966,280 | 1934 |
| Bowman | 2,070,578 | 1937 |
| Ludwig | 2,132,826 | 1938 |
| Peters | 2,227,272 | 1940 |
| Fisher | 2,354,674 | 1944 |
| Harker | 2,385,077 | 1945 |
| Clark | 2,395,960 | 1946 |
| Fenn | 2,546,259 | 1951 |
| Bingman | 2,694,466 | 1954 |
| Watson | 2,719,705 | 1955 |
| Paasche | 2,788,954 | 1957 |
| Paasche | 3,123,455 | 1964 |
| Hausberg | 3,140,163 | 1964 |
| Saubesty | 3,516,230 | 1970 |
| Bornert | 4,045,524 | 1977 |
| Walker | 4,220,078(b) | 1980 |
| Germany | 1,157,977 | 1963 |
| Great Brit. | 866,770 | |

3. Impingement (a) or Wet Impingement (b)

| Name | Number | Year |
|---|---|---|
| Dolline | 1,664,670(b) | 1928 |
| Frey | 1,999,589(b) | 1935 |
| Saunders | 2,086,514(b) | 1937 |
| Ludwig | 2,132,826(b) | 1938 |
| Fisher | 2,337,983(b) | 1943 |
| Harker | 2,385,077(b) | 1945 |
| Fenn | 2,546,259(b) | 1951 |
| Doyle | 2,621,754(b) | 1952 |
| Watson | 2,719,705(b) | 1955 |
| Najarian | 3,075,751(b) | 1963 |
| Gallagher | 3,119,675(a) | 1964 |
| Larsson | 3,138,087(a) | 1964 |
| Krantz | 3,142,548(b) | 1964 |
| Dock | 3,168,029(b) | 1965 |
| Wilhelmsson | 3,168,030(b) | 1965 |
| Wilhelmsson | 3,168,031(a) | 1965 |
| Krantz | 3,170,007(b) | 1965 |
| Krantz | 3,170,384(b) | 1965 |
| Wilhelmsson | 3,279,156(b) | 1966 |
| Halls | 3,421,293(b) | 1969 |
| Saubesty | 3,516,230 | 1970 |
| Bloomer | 3,934,495(b) | 1976 |
| Bornert | 4,045,524 | 1977 |
| Walker | 4,220,078(b) | 1980 |
| Donahue | 4,222,319(b) | 1980 |
| Germany | 823,422(b) | 1951 |
| France | 1,192,088(a)(b) | 1959 |
| Germany | 1,157,977(b) | 1963 |

4. Multiple Openings

| Name | Number | Year |
|---|---|---|
| Bingman | 1,966,280 | 1934 |
| Frey | 1,999,589 | 1935 |
| Brandes | 2,090,994 | 1937 |
| Ludwig | 2,132,826 | 1938 |
| Fisher | 2,337,983 | 1943 |
| Doyle | 2,621,754 | 1952 |
| Najarian | 3,075,751 | 1963 |
| Gallagher | 3,119,675 | 1964 |
| Wilhelmsson | 3,279,156 | 1966 |
| Dock | 3,347,024 | 1967 |
| Halls | 3,421,293 | 1969 |
| Gallagher | 3,782,080 | 1974 |
| Bloomer | 3,934,495 | 1976 |
| Bornert | 4,045,524 | 1977 |
| Walker | 4,220,078 | 1980 |
| Donahue | 4,222,319 | 1980 |
| France | 1,192,088 | 1959 |
| Canada | 687,417 | 1964 |

5. Gyratory or Whirling Action

| Name | Number | Year |
|---|---|---|
| Frey | 1,999,589 | 1935 |
| McCornack | 2,047,424 | 1936 |
| Peters | 2,227,272 | 1940 |
| Fisher | 2,354,674 | 1944 |
| Fenn | 2,546,259 | 1951 |
| Campbell | 2,732,909 | 1956 |
| Tailor | 3,050,919 | 1962 |
| Halls | 3,421,293 | 1969 |
| Germany | 823,422 | 1951 |
| Germany | 1,009,635 | 1957 |

6. Atomization

| Name | Number | Year |
|---|---|---|
| Frey | 1,999,589 | 1935 |
| McCornack | 2,047,424 | 1936 |
| Larsson | 3,138,087 | 1964 |
| Krantz | 3,138,647 | 1964 |
| Hausberg | 3,140,163 | 1964 |
| Krantz | 3,142,548 | 1964 |
| Wilhelmsson | 3,168,031 | 1965 |
| Krantz | 3,170,007 | 1965 |
| Krantz | 3,170,384 | 1965 |
| Erni | 3,182,977 | 1965 |
| Wilhelmsson | 3,279,156 | 1966 |
| Gerhard | 3,795,093 | 1974 |

7. Water-washed Wall

| Name | Number | Year |
|---|---|---|
| Ludwig | 2,132,826 | 1938 |
| Peters | 2,227,272 | 1940 |
| Fisher | 2,337,983 | 1943 |
| Clark | 2,395,960 | 1946 |
| Bingman | 2,694,466 | 1954 |
| Paasche | 2,788,954 | 1957 |
| Larsson | 3,138,087 | 1964 |
| Wilhelmsson | 3,279,156 | 1966 |
| Saubesty | 3,516,230 | 1970 |
| Gerhard | 3,795,093 | 1974 |
| Great Brit. | 866,770 | |

8. Venturi Throttle

| Name | Number | Year |
|---|---|---|
| Bingman | 1,966,280 | 1934 |
| Fisher | 2,337,983 | 1943 |
| Fenn | 2,546,259 | 1951 |
| Doyle | 2,621,754 | 1952 |
| Tailor | 3,050,919 | 1962 |
| Krantz | 3,112,352 | 1963 |
| Gallagher | 3,119,675 | 1964 |
| Larsson | 3,138,087 | 1964 |
| Krantz | 3,138,441 | 1964 |
| Krantz | 3,138,647 | 1964 |
| Hausberg | 3,140,163 | 1964 |

| | -continued | |
|---|---|---|
| Krantz | 3,142,548 | 1964 |
| Dock | 3,168,029 | 1965 |
| Wilhelmsson | 3,168,030 | 1965 |
| Wilhelmsson | 3,168,031 | 1965 |
| Krantz | 3,170,007 | 1965 |
| Krantz | 3,170,384 | 1965 |
| Erni | 3,182,977 | 1965 |
| Wilhelmsson | 3,279,156 | 1966 |
| Dock | 3,347,024 | 1967 |
| Wilhelmsson | 3,391,630 | 1968 |
| Halls | 3,421,293 | 1969 |
| Gallagher | 3,782,080 | 1974 |
| Gerhard | 3,795,093 | 1974 |
| Bloomer | 3,934,495 | 1976 |
| Bornert | 4,045,524 | 1977 |
| Walker | 4,220,078 | 1980 |
| Donahue | 4,222,319 | 1980 |
| Dobias | 4,239,512 | 1980 |

Of the above listed types of washing actions and related patent disclosures, categories 2, 3, 7 and 8 are of particular import.

In the automotive industry today, paint spray booths fall principally into two categories, namely, back-section booths and down-flow booths. One patent showing an improved washer/scrubber adapted to both types of booths in Dobias U.S. Pat. No. 4,239,512.

In back section booths, the cleaning or the washing of the air is accomplished in exhaust plenums which extend along one or both sides of the booth to the exterior of the paint-spraying or work chamber. Representative illustrations of such booths are shown for example in the Harker and Gallagher patents.

In down-flow booths of current design, the cleaning, washing or scrubbing of the air takes place below the work chamber, usually along the longitudinal center line of the work chamber. The scrubbers in these booths fall into two general categories, namely, longitudinal slot washers and plural opening washers. Plural opening washers are shown for example in the patents to Halls, Bloomer, Donahue, Bornert and Walker. Longitudinal slot washers are shown for example in the patents to Dock, Krantz, Larsson, Wilhelmsson and Gerhard.

In all of the above-referenced down-flow booths, the spray painting chamber has a grille floor below which there is a water-washed subfloor over which water or other liquid medium (hereinafter referred to generically as "water") for treating the air or other gas (hereinafter referred to generically as "air") is continuously flooded. Below the subfloor is an exhaust plenum or chamber which communicates with one or more exhaust fans and stacks. In operation, air is drawn downwardly through the spray chamber, the grille floor and the opening or openings in the water washed subfloor and thus into the exhaust system. At the same time, water is continuously flooded into the opening or openings in the subfloor so that the water and air are intermixed to cause the water to remove particulates, i.e., paint overspray, from the air; the object being to remove all but an almost infinitesimal fraction of the particulates from the air so that only clean air is exhausted from the system.

The water in turn is drained to a treatment facility or "sludge farm" and then recirculated back to the subfloor of the booth.

Of particular pertinency to the present invention are the down-flow booths with slot-type washers, especially Krantz U.S. Pat. Nos. 3,112,352, Larsson 3,138,087, Wilhelmsson 3,168,030 and 3,168,031, and Gerhard 3,795,093. As shown by these patents, as well as others above mentioned, considerable effort has been expended in the art to improve and enhance an intimate admixture of the water and air to cause the water to thoroughly scrub the air free of particulate matter.

While these devices have been reasonably effective in removing paint overspray of relatively large particle size from the air exhausted from the spray chamber, they have not been entirely satisfactory with recently developed paints and spray painting systems which produce an overspray having extremely small particle size. Further disadvantages of these devices reside in their propensity for accumulation of paint deposits, inconsistency of operation over the length of the booth, and difficulty of cleaning.

SUMMARY OF THE INVENTION

It is well known that large particles of paint or other contaminant matter are more easily removed from air than small particles. This is probably true because virtually all air washing devices rely on the concept of passing the air through a myriad of droplets of water and it is easier for the droplets to adhere to larger particles and entrain them. Smaller contaminant particles apparently pass between and around the water droplets and remain in the air. Accordingly, given a particular efficiency for a particular device, that efficiency will decrease as the contaminant particle size decreases.

The present invention, rather than relying merely on the creation of a plurality of droplets, flows opposed sheets of water over a subfloor of a paint spray booth, down the steeply inclined walls of a shallow, V-shaped slot, and against upturned ledges along the inner edges of the slot walls. These ledges kick the water from each of the opposed slot walls upwardly and inwardly to form a dense curtain of water completely covering the slot opening. When the paint-laden air is pulled into the slot and thus accelerated through this curtain of water, there is formed a dense sponge-like mass of liquid and air in which the air and water are violently intermixed and which effectively removes almost all of even the very small particles of paint. According to the invention, even greater efficiency is achieved by providing an expansion chamber immediately beneath the slot, into which the air and water are discharged and decelerated, and then accelerating the air and water through a second V-shaped slot at the bottom of the expansion chamber.

To control and again decelerate the mixture discharging from the second slot, an inclined baffle sheet extends laterally beneath the second slot. By virtue of the structure thus provided, additional cleaning action is achieved by wet impingement on the walls defining the two slots and on the inclined baffle. Also, the structure causes the air and water to change speed and direction frequently thereby further to enhance the scrubbing action.

The present invention also facilitates removal of the water and moisture from the air so that only clean dry air is exhausted to atmosphere. This is accomplished in the following manner. When the air and the water, which has now entrained almost all contaminant particles, is discharged from the second V-shaped slot, it is carried by the inclined baffle sheet toward an auxiliary wall at one side of the booth. The sheet terminates short of this wall so that the air and water are now forced to move downward into and to be decelerated in an exhaust plenum of large volume at a location therein which is remote from the trough or sluiceway that carries the water away for recycling. Since there is no trough into which the air and water are plunged, as is common in many prior art devices, the air drops most of its moisture in the plenum before being exhausted to atmosphere. As an added feature, a curved deflector plate in the approximate shape of a 90° segment of a circle may be provided beneath the opening between the flood sheet and the auxiliary wall. The outer edge of the deflector plate is positioned a short distance inwardly of the wall, with the result that ninety percent of the water passes behind the deflector plate and runs off to a sump, while most of the air is swept laterally across the width of the exhaust plenum above the level of the water.

In addition to its several advantages in effectively scrubbing the air clean of even very small particulate matter, the invention provides an air scrubber which requires very little maintenance, is not subject to clogging and assures uniformity of cleaning action throughout the full length of the booth. All surfaces are continuous, flat, planar surfaces without crevices or corners within which excessive accumulations of paint sludge could build up. Thus, when cleaning or periodic maintenance is required, the washer is easy to clean and maintain.

Other objects and advantages of the invention will become apparent from the following detailed description, as considered in conjunction with the accompanying drawings.

BRIEF DESCRIPTION OF THE DRAWINGS

FIG. 1 is a fragmentary vertical cross-sectional view of a first paint spray booth incorporating a preferred embodiment of the air washer/scrubber of the invention;

FIG. 2 is a fragmentary vertical cross-sectional view of a second paint spray booth incorporating the air washer/scrubber of the invention; and FIG. 3 is an enlarged vertical cross-sectional view of the air washer/scrubber.

DETAILED DESCRIPTION

The paint spray booth illustrated in FIG. 1 is (except for the air washer/scrubber) a more or less conventional form of vertical down draft center draw paint spray booth of the down-flow type having a two-sided exhaust. The booth includes a work chamber 10 through which articles to be painted are moved by means of conveyor means located generally at 12 which extends longitudinally through the booth along the longitudinal centerline thereof. The floor of the booth on each side of the conveyor is formed of a grating or grille 14 to afford communication between the chamber 10 and the air washer, which is indicated generally at 16.

The roof of the booth is provided with fresh air inlets (not shown) to provide a uniform flow of ventilating air downwardly through the work chamber and the grille floor, and thence through the air washer and out an exhaust system, which may be a dual-sided system as shown in FIG. 1 or a one-sided exhaust as shown in FIG. 2. For conventional spray painting, the rate of flow of ventilating air through the spray chamber 10 generally is in the order of 2000 cubic feet per minute (cfm) per linear foot of booth, at a uniform velocity of about 100 feet per minute (fpm). However, for other forms of spray painting, the air flow and velocity may be increased or decreased, for example, to 1200 cfm and 60 fpm for rotary bell electrostatic spray painting system.

The washer unit 16, shown more clearly in FIG. 3, is positioned in the center of a water-washed subfloor 18 which is located below the grille floor 14 and slopes downwardly from either side wall 20 of the chamber 10 toward the longitudinal centerline of the booth at an angle in the range, preferably, of 5° to 10° from the horizontal. The subfloor 18 is provided at the center of the booth with longitudinally extending generally V-shaped walls 22 sloping downwardly at an angle in the range, preferably, of about 35° to 45°, which terminate in upturned ledges 24 spaced from each other to form a slot 25 extending lengthwise of the booth. Whereas prior art slot-type air washers sought to achieve very high velocity air flow through the slot and therefore utilized narrow slots, the washer of the present invention operates successfully at lower velocities and utilizes a significantly wider slot, preferably about 8" wide and up to 10" wide, if desired, for conventional spray painting operations. Under such conditions, an 8" wide slot at 25 produces an air velocity in the order of 3000 fpm, which is significantly lower than in prior art washers. The lower velocity contributes to a much quieter operation.

To prevent paint resulting from the spray painting operation from accumulating on the subfloor 18, and to provide the required washing liquid for the washer 16, the subfloor is flooded continuously by washing liquid flowing inwardly over the subfloor 18 from the side walls 20 toward the center of the booth, down the V-shaped walls 22 and against the ledges 24, which ledges extend essentially perpendicular to the walls 22 and which thereby "kick" the water upwardly and inwardly so as to completely cover the slot opening with a dense curtain of water. When exhaust air from the chamber 10 is drawn downwardly through this curtain of liquid, a dense, sponge-like, aerated mass of liquid is formed which effectively entrains most of the paint particles with very high efficiency.

For even greater efficiency, the mass of air and water discharging downwardly through the slot 25 enters into an expansion chamber 26 formed by spaced, downwardly extending, side walls 28 and downwardly converging bottom walls 30, the lower edges of which are spaced from each other to form a second V-shaped slot 32 extending lengthwise of the booth so as to be directly below and generally contiguous with the slot 25. Slot 32 preferably has a width approximately equal to that of slot 25 but may be provided with adjustment means comprising a slotted plate 34. Plate 34 is adjustably movable along the bottom wall 30 to vary the width of slot 32 depending on varying air velocities desired through the device.

As a consequence of this construction, the air and water are first accelerated through the slot 25, then decelerated in the expansion chamber 26 and again accelerated through the slot 32, thereby causing the air to change directions several times to insure thorough admixture of the air and water and removal of contaminants from the air. Also, impingement of the air on the water washed surfaces of the walls 22 and 30 would appear to contribute to the efficiency of the scrubbing action. If desired, the lower edges of the converging walls 30 could be provided with ledges similar to the ledges 24, but based on experimentation to date, this has been found to unduly increase the resistance to air flow (and thus the load on the exhaust fan or fans) without producing a concomitant increase in efficiency. However, such ledges may prove advantageous for even more difficult gas-cleansing tasks.

Further to increase cleansing efficiency, and to commence conditioning the air/water mixture for separation of the air, an inclined baffle sheet 36 extends downwardly below the slot 32. As shown in FIG. 3, this may be an entirely separate member, or as shown in FIG. 1, it may be extended downwardly from one wall of the expansion chamber and then inwardly. The sheet 36 angles downwardly preferably at about a 30° angle beneath the expansion chamber and terminates in an upturned lip 38. The plate thus defines a second expansion chamber, a tertiary wet impingement surface and, with the lower edge of one of the walls 30, a third restricted orifice within which the air is accelerated through a curtain of water falling from the one wall 30, and thereafter decelerated again, whereby further to contribute to the air cleansing actions.

The inclined baffle sheet 36 terminates adjacent an auxiliary wall 40, preferably spaced about 10 inches from the upturned lip 38 of the sheet 36, which wall 40 extends downwardly to a position slightly below the lowermost portion of the sheet 36. The upturned lip 38 causes the water descending along the sheet 36 to be driven upwardly and to form another curtain of water over the space between the lip and the wall 40, whereby the air is again accelerated through yet another curtain of water, and thereafter discharged and decelerated into an exhaust plenum of very large volume, wherein the air is separated from the water.

In the embodiment of FIG. 1, the bottom floor 42 of the exhaust plenum has a high point below the discharge slot between the sheet 36 and wall 40, and slopes downwardly laterally in both directions toward troughs 44 and 46, which drain the water to a sludge farm or treatment facility, from which the water is recirculated back to the subfloor 18. Dual exhaust chambers 48 and 50 are provided for exhausting the now thoroughly cleansed and essentially dry air back to atmosphere.

In operation, water is recirculated to the subfloor 18 at a rate in the order of about 15 to 35 gallons per minute (gpm) per side per linear foot of booth, or a total of 30 to 70 gpm per foot—a customary volume being about 50 gpm per foot. For spray painting operations, the width of the several slots is such as to produce air velocities in the order of about 2500 to about 3000 fpm through the various slots. The dimensions stated herein are such as to produce the desired air velocities for normal spray painting, with air flow through the spray chamber 10 at the rate of 2000 cfm per linear foot and a uniform velocity of 100 fpm. For different ventilation air flows, the width of each slot is preferably adjusted to attain air velocities within the preferred range, in which case the water flow is also maintained in the preferred range.

In one preferred example, the air velocity through the slot 25 is about 3000 fpm, in the several expansion chambers about 1265 fpm or less, through the slots 32 and 38-40 about 2665 fpm, and in the exhaust plenum about 500 to 800 fpm, while water flow is maintained at about 50 gpm per foot (25 gpm per foot per side). This has been found to effectively balance the dual objectives of highly efficient air scrubbing and relatively quiet operation.

Referring to FIG. 1, uniformity of water distribution over the subfloor 18 is achieved with minimum plumbing by delivering the water to the outer upper edges of the floor by means of widely spaced supply pipes 80, the outlet of each of which is covered by a splash guard 82. The water is delivered into a first trough 84 of relatively great depth, wherein the force of the incoming water is dissipated and the water is distributed uniformly throughout the full length of the booth. Water exits from the first trough through metering slots in the bottom edge of the trough wall 86 for uniform distribution into a second trough 88 wherein the water becomes relatively quiescent and non-turbulent, and from which the water overflows a weir 90 for uniform distribution over, and thorough and continuous wetting of, the entirety of the subfloor. This also insures uniformity of water distribution to and uniformity of air cleansing action in the air washer/scrubber throughout its full length. The uniformity of distribution is further enhanced by placing the weir 90 at an angle to the floor, preferably about 45 degrees to horizontal, so that the water flows smoothly down the weir and onto the floor.

To facilitate draining of the two troughs when the booth is not in operation, the weir 90 is provided with spaced slits along its lower edge.

With the booth operating as above described, paint laden air from the work chamber 10 is drawn downwardly toward the water-washed subfloor 18 and, at an accelerating rate of speed, through the curtain of water formed by the ledges 24, and through the V-shaped slot 25. The air and the water, which has now entrained most of the paint particles, decelerates into the expansion chamber 26 and is again accelerated through the second V-shaped slot 32. The mixture of air and water then impinges against the baffle sheet 36 and the air again expands. The water, as seen in FIG. 3, flows down the sheet 36 and is kicked upwardly so as to form an umbrella of water across the gap between the sheet and the auxiliary wall 40. A final cleaning action occurs as the air is drawn downwardly through this umbrella of water. The water drops downwardly to the sloping bottom floor 42 and is carried away by the troughs 44 and 46 to be treated and recirculated. The clean air divides and is exhausted through exhaust chambers 48 and 50.

The spray booth shown in FIG. 2 is essentially the same as that shown in FIG. 1 with two exceptions. Whereas in FIG. 1, the air and water discharged from the washer are divided and discharged both to the left and to the right into dual exhaust ducts and dual drain troughs, in the device of FIG. 2 there is only one trough and one exhaust duct. Referring to FIG. 2, a wall 52 is positioned immediately adjacent the washer 26, outwardly of the auxiliary wall 40, so that the wall 52 forms one side of the lower chamber or exhaust plenum 54. The floor 56 of chamber 54 slops downwardly from wall 52 toward a trough 58. An exhaust duct 60 accommodates removal of the washed air from the plenum 54.

The device of FIG. 2 also includes a curved baffle 62 extending longitudinally of the booth below the auxiliary wall 40. The baffle 62 preferably is in the form of a 90° circular arc facing toward the exhaust duct. The rear edge 64 of baffle 62 is located about 1½" inwardly of wall 40 and about 10" below the lower end of that wall. Without the curved baffle, both the air and the water move down toward the floor and there is a tendency for water spray to drift toward the exhaust duct with the air. It is desirable to exhaust only clean, dry air to atmosphere and the curved baffle aids in achieving this object by acting effectively as an air-water separator.

When the water and the clean air, as described earlier with reference to FIG. 1, are discharged downwardly through the space between the lip 38 and the auxiliary wall 40, at least 90% of the water drops down behind the baffle 62 directly to the floor and thence to the trough to be carried away for treatment and recirculation. The air, on the other hand, strikes the curved baffle and is deflected directly across the lower chamber 54 and into the exhaust duct 60. Being at a relatively great height above the water on the floor and in the trough, there is little tendency for the air to pick up extraneous moisture. Accordingly, only clean dry air is exhausted to atmosphere.

Alternatively, or in addition, eliminator baffles may be provided in the exhaust plenum to aid, where necessary, in removing moisture from the air and preventing drifting of water into the exhaust duct. Specifically, as shown in FIG. 2, an eliminator baffle 66 may be provided just above the level of the water on the floor 56 for directing the air upwardly away from the water and toward a second baffle 68 depending from the ceiling of the exhaust plenum (i.e., the underside of the subfloor 18). A third baffle 70 may then be provided at the lower entrance edge of the exhaust duct 60, and finally a fourth baffle 72 may be provided within the mouth of the duct. This latter baffle, if provided, is preferably a vertically extensible baffle, installed in longitudinally discrete segments each adjustable as to height, whereby the same can be utilized as valves to vary the size of the exhaust duct opening incrementally along the length of the booth so as to equalize air flow through the spray chamber and the washer and into the exhaust duct, even if a single exhaust fan is located at one remote end of the booth, or if plural exhaust fans are widely spaced along the length of the booth.

Manifestly, some or all of the eliminator baffles may either be utilized or omitted in various booth designs depending on the water drifting problems encountered. Similarly, the arcuate baffle 62 may be omitted, in which case the auxiliary wall 40 could be extended to the floor 56 to form the side wall of the exhaust plenum, whereupon the wall 52 could be omitted.

Should eliminator baffles be found desirable in the spray booth design of FIG. 1, baffles corresponding to any or all of baffles 66, 68, 70 and 72 can be provided in pairs symmetrically on opposite sides of the center line of the booth.

A particular feature of both booth designs that contributes to elimination of water-carry-through to the exhaust ducts is the location of the water trough(s) or sluiceway(s) immediately below the exhaust duct(s), and the location of the discharge from the washer remote therefrom. Thus, only clean dry air is exhausted to atmosphere.

Referring again to FIG. 2, the embodiment of the washer 16 there shown incorporates an inclined baffle sheet 36 which is hingedly or pivotally mounted on one wall 28 of the expansion chamber 26, as indicated at 92. Normally, the sheet is locked by a suitable means in its operational position as shown, but when the booth is shut down for maintenance, the sheet can be unlocked and swung to the side, thereby to expose the upper side of the sheet and the lower extremities of the washer for ease of maintenance and cleaning.

Thus, the invention provides improved air washing and scrubbing means for paint spray booths and other applications affording the advantages of high efficiency, reduced noise, freedom from clogging and excessive sludge accumulation, reduced maintenance, and ease of cleaning.

While certain embodiments of the invention have been illustrated and described herein, it will be understood that various modifications may be made therein without departing from the scope of the invention, as defined by the appended claims.

What is claimed is:

1. A gas scrubbing or washing device for use in conjunction with a liquid-washed subfloor sloping toward a longitudinally extending slot in the subfloor, means for flowing liquid over the subfloor and into the slot, and means for drawing gas downwardly through the slot for admixture with the liquid, comprising downwardly convergent, generally V-shaped walls leading from the subfloor to the slot, said walls terminating in upturned ledges spaced from each other to form the slot, the angle of said walls and said ledges and the width of said slot being such as to cause liquid to impinge against said ledges and to be thrown upwardly and inwardly thereby so as to cover the slot with a dense curtain of liquid, the angle of said walls and the width of said slot being such as to cause gas to enter the slot and the curtain of liquid at an uniformly accelerating velocity so that the liquid and gas in the slot create a dense, sponge-like aerated mass within which particulate matter entrained in the gas is transferred to and entrained in the liquid.

2. A device according to claim 1, including improved means for flowing liquid over the subfloor comprising a first trough adjacent the upper outer edge of the subfloor for receiving the liquid, a second trough inwardly from the first trough and shallower than said first trough, a wall separating the two troughs and having metering slots in its lower edge for metering liquid from said first trough into said second trough, and a weir at the inner side of said second trough for flowing liquid from said second trough inwardly over said subfloor.

3. In a device according to claim 1 wherein the means for flowing liquid over the subfloor includes a weir over which the water is flooded onto the floor, the improvement comprising a weir which is inclined inwardly and downwardly toward the subfloor.

4. A device according to claim 1, wherein said V-shaped walls are disposed at about a 40° angle from the horizontal, and said ledges extend generally normal to the lower edges of said walls.

5. A device according to claim 1, including an expansion chamber beneath the slot, said expansion chamber comprising spaced downwardly extending side walls parallel to the slot and downwardly converging bottom walls forming a second slot spaced below and generally contiguous with said first mentioned slot.

6. A device according to claim 5, including means for adjustably varying the width of said second slot.

7. A device according to claim 5, including a baffle sheet angling laterally downward beneath said second slot for impingement thereon of the air and liquid mixture.

8. A device according to claim 7, including means pivotally mounting said baffle sheet for movement away from said second slot for facilitating maintenance of the device.

9. A device according to claim 7, including an upwardly projecting lip on the outermost edge of said baffle sheet and an auxiliary wall spaced from said lip and forming with said lip a constricted passage, said upwardly projecting lip causing liquid flowing over said baffle sheet to be projected upwardly and outwardly toward said auxiliary wall for forming a curtain of liquid over said constricted passage.

10. A device according to claim 9, including an exhaust duct laterally remote from said constricted passage, and a curved deflector plate beneath said constricted passage for deflecting washed air toward said exhaust duct.

11. A method of treating a gas with a liquid by passing the same downwardly through a longitudinally extending slot in the bottom of a liquid-washed subfloor, comprising the steps of: providing downwardly converging, generally V-shaped walls leading from the subfloor to the slot, providing upturned ledges on the lower inner edges of the walls causing liquid flowing over the subfloor and said walls to impinge against said upturned ledges and to be thrown by said ledges upwardly and inwardly over and to completely cover the slot with a dense curtain of liquid; causing gas to be uniformly accelerated downwardly between said walls and through the slot and the curtain of liquid to form a dense sponge-like aerated mass within which the gas and liquid are intimately mixed, and thereafter separating the gas from the liquid.

12. A method according to claim 11, including the steps of discharging the gas and liquid downwardly into a lower chamber, permitting the liquid to drop down to the bottom of the chamber, moving the gas against a curved baffle to deflect the gas across the chamber above the bottom thereof, and exhausting the gas from the chamber.

13. A method according to claim 11, including the steps of expanding the gas and liquid mix emerging from the slot into an expansion chamber immediately below the slot and longitudinally coextensive therewith, and again accelerating the mix by passing it through a second V-shaped slot at the lower portion of said expansion chamber.

14. A method according to claim 13, including the further steps of impinging the gas and liquid emerging from said second slot against a baffle sheet.

15. A method according to claim 14, wherein the baffle sheet is downwardly inclined, and including the step of causing liquid flowing downwardly over said sheet to be deflected upwardly at the lower end thereof for creating a further curtain of liquid through which the gas is passed.

* * * * *